United States Patent [19]
Gregoranto

[11] Patent Number: 5,501,038
[45] Date of Patent: Mar. 26, 1996

[54] PLANTED POT SELF-POSITIONING PLANT SUPPORT DEVICE

[76] Inventor: Antoine Gregoranto, 843, Thibaudeau, Ile Bizard (Québec), Canada, H9C 2T8

[21] Appl. No.: 395,236
[22] Filed: Feb. 27, 1995
[51] Int. Cl.$^6$ .................................................. A01G 9/12
[52] U.S. Cl. .................................................. 47/70; 47/47
[58] Field of Search .......................... 47/70, 47 R, 47 L

[56] References Cited

U.S. PATENT DOCUMENTS

| | | | |
|---|---|---|---|
| H 824 | 10/1990 | Ghafoorzai | 47/70 |
| 2,120,599 | 7/1937 | Brown. | |
| 2,893,169 | 7/1959 | Shepherd. | |
| 3,739,523 | 6/1973 | Tuffli. | |
| 4,020,592 | 5/1977 | Saunders. | |
| 4,173,098 | 11/1979 | Smith | 47/70 |
| 4,509,289 | 4/1985 | Fogelson. | |
| 5,327,678 | 7/1994 | Schweiker | 47/70 |

FOREIGN PATENT DOCUMENTS

| | | | |
|---|---|---|---|
| 89291 | 9/1983 | European Pat. Off.. | |
| 1581467 | 8/1969 | France. | |
| 2519513 | 7/1983 | France | 47/70 |
| 2558682 | 8/1985 | France | 47/70 |
| 2323763 | 11/1974 | Germany | 47/70 |
| 3435071 | 4/1986 | Germany. | |
| 141586 | 8/1953 | Sweden. | |
| 2191673 | 12/1987 | United Kingdom | 47/70 |
| 2253126 | 9/1992 | United Kingdom | 47/70 |

*Primary Examiner*—Terry Lee Melius
*Assistant Examiner*—Joanne C. Downs
*Attorney, Agent, or Firm*—François Martineau; Pierre Lespérance

[57] ABSTRACT

A rod like plant support is held in a plant pot adjacent the side wall of the latter. The holder is in the form of a flat discoid base plate, with an integral socket upstanding from a central portion thereof. A rod engages into and upstands from the socket. A number of integral fingers radially outwardly project from the discoid base plate generally within its plane. The length of each finger is adjustable to fit plant pots having varying internal diameters or varying configurations. Preferably, length adjustment of the fingers is made by cutting end portions thereof along transverse weak lines. In this way, not only is the plant support immobilized within the plant pot, but also, the relative position of the upstanding tie-rod is adjustable relative to plant foliage configuration.

10 Claims, 3 Drawing Sheets

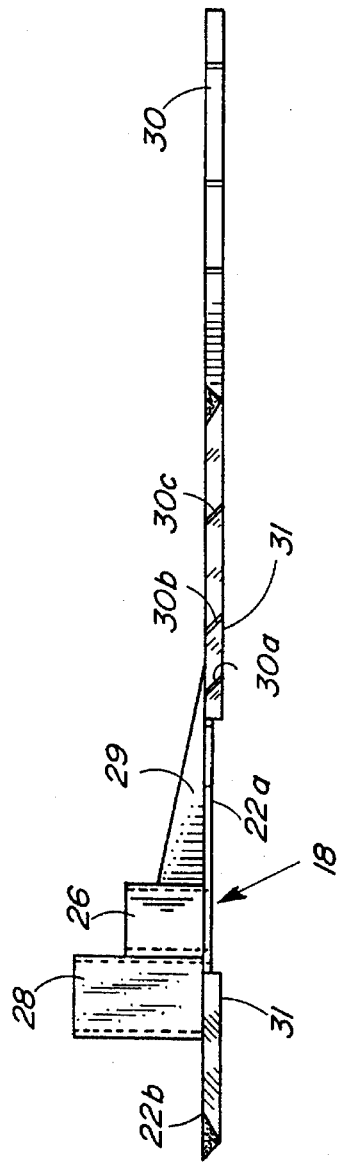
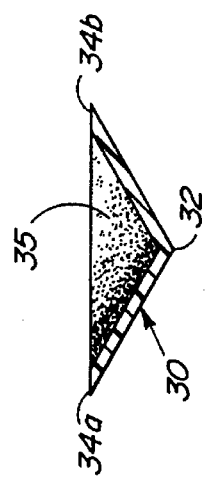

5,501,038

PLANTED POT SELF-POSITIONING PLANT SUPPORT DEVICE

FIELD OF THE INVENTION

The present invention relates to plant pots, specifically to a plant pot provided with means to adjustably position a plant support in upright position at a selected location within the plant pot.

BACKGROUND OF THE INVENTION

Plant and flower pots on the market have different sizes and shapes and are used with or without a saucer, namely a dish shaped base forming a reservoir for receiving excess water draining through drainage hole(s) of the pot. Whenever it is desired or required to support the plant against tilting, a rod like plant support is pushed into the soil and the plant attached or wound around the same. However, the support itself often tends to tilt, especially if the plant has attained a large size, since the soil does not constitute an efficient holder for the plant support. Moreover, it is often difficult to select a particular (i.e., excentric) location for the upright support rod within the plant pot, e.g. to adapt to variable levels of density of foliage of the plant.

Various attempts have been made to solve these problems.

For instance, in U.S. Pat. No. 3,739,523 issued Jun. 19, 1973 to John Martin Tofli, there is described a plant support which is integral with a base plate, the plant support extending through a central drainage hole of the plant pot and the base plate sandwiched between the bottom of the plant pot and the saucer.

In U.S. Pat. No. 4,020,592 the saucer is provided with an integral socket extending through the central drainage hole of the flower pot and receiving and holding a plant support which extends centrally through the plant pot and outwardly therefrom.

In both these patents, it is essential to provide a saucer for the flower pot. In both these patents, the plant support or stake is disposed centrally of the plant pot and therefore constitutes an obstruction to the proper central positioning of the plant within the plant pot.

In French patent No. 1,581,467 issued Aug. 11, 1969, to George Bride-Etivant, a plant support is formed with a bottom liquid reservoir which is inserted within a plant pot. Here again, the plant holder is centrally located and the liquid reservoir occupies excessive room within the plant pot limiting the growth of the plant roots.

In U.S. Pat. Nos. 2,893,169 issued Jul. 7, 1959 to I. L. Shepherd, and 4,509,289 issued Apr. 9, 1985 to Seymour Fogelson, there are shown plant supports having holders directly inserted within the plant pot and which occupy considerable space therein, therefore compromising the growth of the plant roots.

In French patent application No 2 558 682 published 2 Aug. 1985 to Maurice CHEVALIER, there is disclosed a plant pot support member consisting of a flat discoid base plate 3 transversely supporting an excentric socket 2. The socket 2 includes a top mouth for through-engagement by a plant support rod. The base plate 3 has either a large single drain hole 6 (FIG. 2), or a plurality of smaller drain holes 7 (FIG. 3). Triangular upright stay plates 4, 5, radially outwardly project from the upright socket 2 and edgewisely anchor to the base plate 3, whereby accidental axial tilt of the socket 2 under plant-borne loads may be prevented. The radial stay plates 4, 5, extend short of the circumferential edge of the discoid base plate 3.

French patent No 2,524,256 published in 1984 in the name of Azoulay discloses a plant support including a number of radial fingers of adjustable length. The radial fingers are connected at their inner ends to an upright socket, and at their radially outer ends to the circumferential edge of the plant pot top mouth. These fingers again prevent accidental axial tilt of the socket under plant-borne forces, but are cumbersome and would make it difficult for the plant keeper to access the plant pot about the base plate portion of the holder.

There also exists a plant pot comprising a lower water chamber under the plant pot per se, the bottom of which consists of a screen partly covered by a cloth in contact with the soil and draining the water from the water chamber by capillarity. To anchor this screen, a plurality of studs are provided, which protrudes over the screen. The plant holder must avoid these studs in order to rest directly on the screen with the rod upright. The soil in the pot, when being watered, becomes more fluid and does not properly support the holder. Therefore, it is important that the holder be supported by the screen or bottom wall. Otherwise, the purpose of the plant holder of making the plant grow as straight as possible is not obtained.

OBJECTS OF THE INVENTION

The general object of the present invention resides in the provision of a positioning device for a potted plant support that will also immobilize the plant support within the plant pot.

A more specific object of the present invention is to provide a plant pot provided with means to adjust the relative position of a plant support to fit a plant pot, which is of simple low cost construction, and which can be adapted to plant pots of various sizes and shapes and used with or without a saucer.

SUMMARY OF THE INVENTION

In accordance with the invention, there is provided a self-positioning device for supporting in upstanding fashion an elongated plant holder inside a flower pot, the flower pot having a base wall, a side wall and a top mouth, said self-positioning device consisting of: (a) a generally flat base plate member, for abutting flatly against said base wall of the flower pot, the base plate member being adapted to be embedded into a layer of earth; (b) a socket member, extending transversely from said base plate member integrally thereof, said socket member being open at its outer top free end, said socket member adapted to receive the lower end portion of said elongated plant holder and to support said plant holder in upright position; (c) a number of radial finger members, extending radially outwardly from said base plate member integrally thereof and substantially within the plane thereof; and (d) means for adjusting the length of each said finger member; wherein said self-positioning device is adaptable to any one of flower pots of different sizes and shapes with said finger members preventing accidental sliding displacement of said base plate member over said flower pot base wall, and wherein said self-positioning device enables selective positioning of said socket member within said flower pot to accommodate any one of a variety of plant foliage configurations.

Preferably, said length-adjusting means includes a number of lengthwisely spaced frangible sections made transversely of each said fingers. Each said finger could then be cross-sectionally V-shape, with the apex thereof being downwardly directed, for direct engagement against said flower pot base wall. The apices of these V-shaped fingers could further define a common plane which is downwardly offset relative to the bottom face of said base plate member, whereby said base plate member overhangs spacedly over said flower pot base wall. There could be at least three said fingers, of which at least two fingers are directed in generally opposite directions. Preferably, there would be five circumferentially equidistant fingers.

It is envisioned to add at least a second socket member, upwardly projecting from said base plate member, said second socket member defining an inner diameter and/or an inner shape or size different from that of the first mentioned socket member.

A number of drain holes could be made into said base plate member.

BRIEF DESCRIPTION OF THE DRAWINGS

In the annexed drawings,

FIG. 4 is an edge view of the base plate, socket, and radial fingers of the plant support according to the invention; and FIG. 5 is a cross-sectional view of a plant holder finger, taken about line 5—5 of FIG. 3.

DETAILED DESCRIPTION OF PREFERRED EMBODIMENTS

Figure 1:
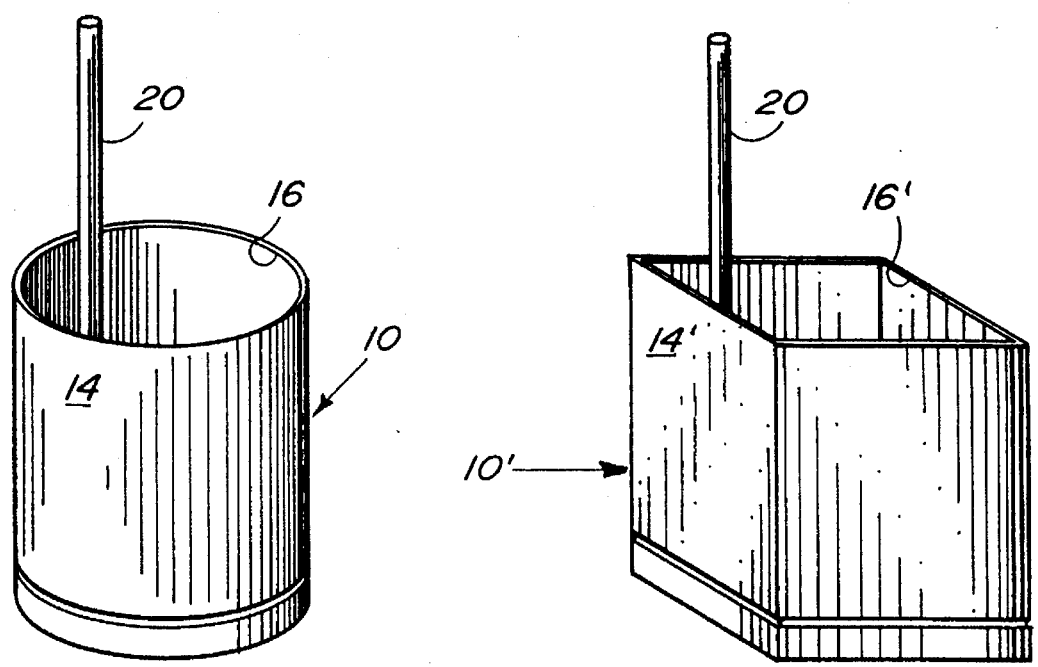
FIGS. 1 and 2 are elevational views of cylindrical and cubical plant pots, respectively, containing a plant holder in accordance with the invention.
Figure 1:
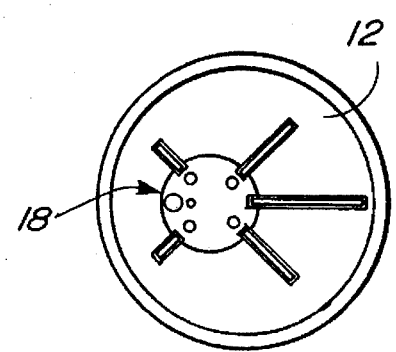
Figure 2:
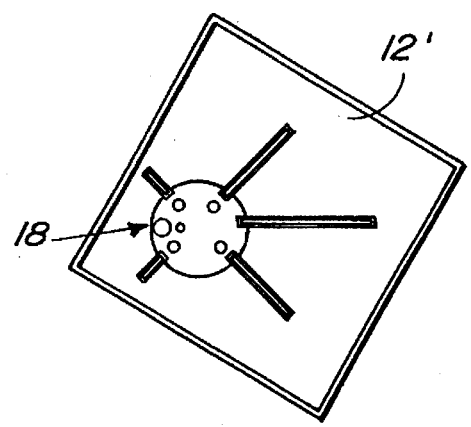

FIGS. 1–2 show two plant pots: a cylindrical plant pot 10 and a cubic plant pot 10'. Each pot 10 (10') is formed by a bottom wall 12 (12') and a side wall 14 (14') which defines an open top container with a top mouth edge 16 (16'). It is envisioned that the plant pots could have an other cross-sectional shapes, such as hexagonal, octagonal, and the like cross-sectional shape, and may have any suitable size.

A holder 18 is provided inside the plant pot, against the flooring 12 (12'), to hold an elongated, rigid, rod-like plant support 20 in upright position, with the bottom end of the plant holder 18 resting on the bottom wall 12 (12') of the plant pot. Rod 20 is elongated, usually extending through mouth 16 (16') and upwardly therebeyond.

Holder 18 includes a flat, discoid, plate-like base member 22. Base plate 22 is diametrally much smaller than flooring 12 (12') of the flower pot 10 (10'), so as to fit horizontally flat thereagainst. The base plate 22 preferably has a number of drain holes 24, and may be used with a saucer (not shown) if so desired. Base plate 22 is preferably discoid, but other suitable shapes, such as square or octagonal, are not excluded from the scope of the invention.

Two socket members 26, 28, are integrally mounted to the base plate 22 transversely thereof. The inner diameter and size of the socket members 26 or 28 should be complementary to the outer diameter of the elongated rod 20; with socket members 26 and 28 having different inner diameters, for engagement therein by plant support rods 20 of varying external diameters. The cross-sectional shape of rods 20, 20, and the internal diameter and shape of the sockets members 26 and 28 should be complementary to one another, e.g. circular or square, although other cross-sectional shapes would also be envisioned within the scope of the invention.

Figure 3:
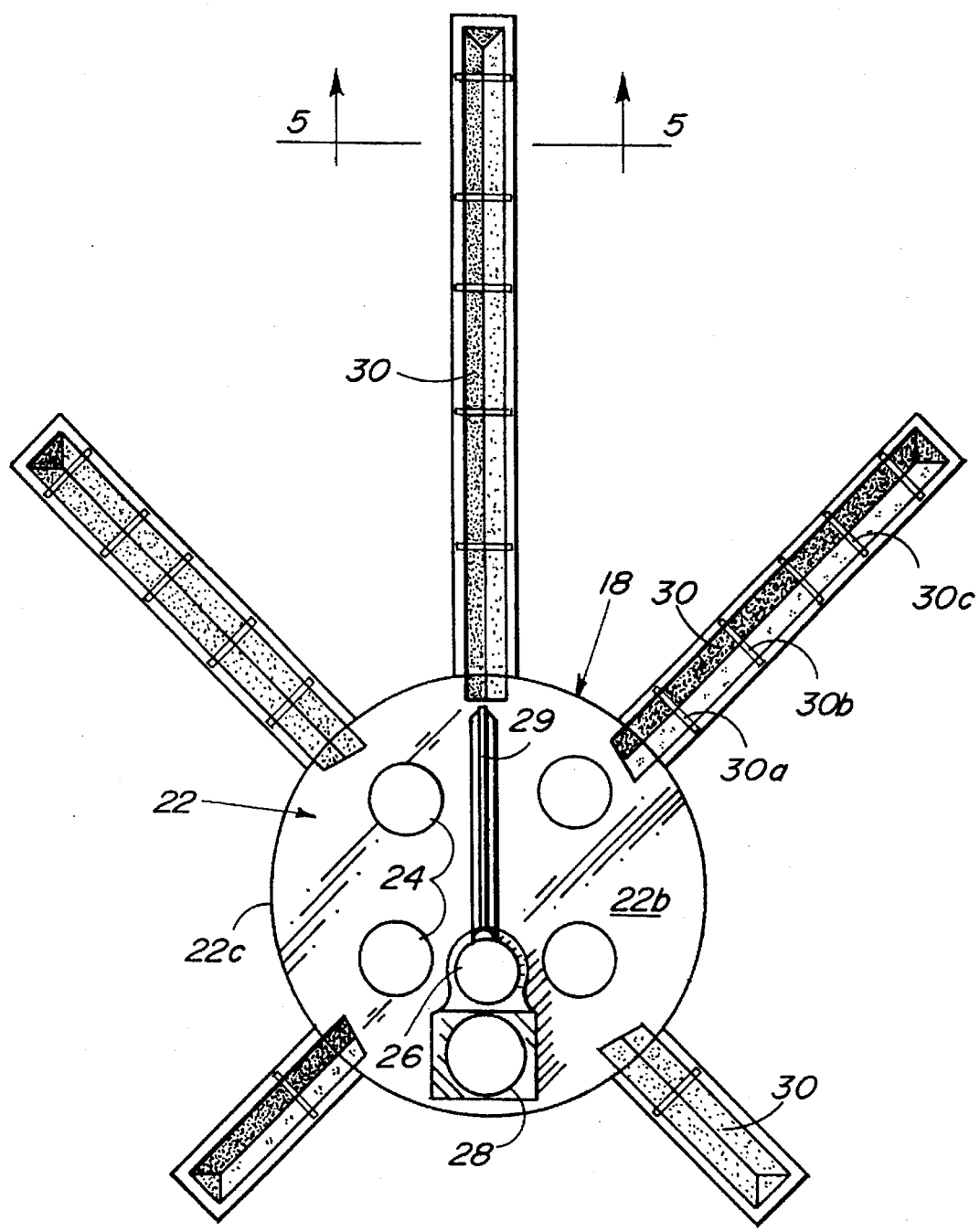
FIG. 3 is an enlarged, top plan view of the plant support in accordance with the invention.

Hence, base plate 22 defines a bottom face 22a, and an opposite top face 22b, from which upwardly project the socket members 26 and 28. The upright socket members 26 and 28 are excentrically disposed over discoid plate 22, the larger socket member 28 being located adjacent the circumferential edge 22c of discoid plate 22, while the smaller socket member 26 is located radially inwardly of socket 28 and contiguous thereto. Preferably, as illustrated in FIGS. 3 and 4, both socket members 26, 28 are tangentially adjacent and integrally linked to one another at their respective outer periphery, whereby socket members 26, 28 gain structural stiffness due to the greater total cross-section thereof, relative to only one socket member alone. This increased structural stiffness will help prevent rod 20 from bending the socket member in which it is inserted under the transverse force exerted by the plant on the rod, while the choice is still there to use either one of socket members 26, 28 depending on the dimension of the rod 20 being used.

The upright socket members are reinforced by a triangular upright stay plate 29, extending over disc plate top surface 22b and being edgewisely anchored thereto.

As shown in FIGS. 3 and 4, stay plate 29 is preferably aligned with both socket members 26 and 28 and is integrally attached to socket member 26, to strengthen holder 18. This way, if either one of the socket members 26, 28 is used, it is well retained due to the total stiffness conferred by the two sockets and stay plate assembly.

According to the heart of the invention, there are provided a number of fingers 30, for example five fingers 30, as shown, said fingers radially projecting from the circumferential edge of discoid plate 22 integrally thereof. Fingers 30 extend generally within the plane of the base plate 22, so as to extend the overall supporting surface of the holder 18. Preferably, fingers 30 are circumferentially equidistant. Means are provided to adjust the length of each finger 30 relative to that of the other fingers 30, so as to position socket 26 or 28 at a desired location within the flower pot 10 (10') relative to the side wall 14 (14') of the flower pot. One preferred length-adjusting means for the fingers 30 would consist of a plurality of lengthwisely spaced, transverse grooves 30a, 30b, 30c, . . . made in lengthwisely of the elongated fingers. These grooves form weak lines of thinner material to facilitate cutting of the fingers at a selected groove. By properly adjusting the length of each finger 30, in relation to the inner diameter and cross-sectional shape of the flower pot side wall 14 (14'), the plant holder 18 can become not only immobilized into pot 14 (14'), but the relative location of the upright sockets 26, 28, can be adjustably positioned within the pot, thus also adjusting the position of upstanding rod 20 to more fully accommodate the plant keeper requirements as well as various plant folliage configurations.

Obviously, once a finger 30 has been adjusted in length by cutting an end portion thereof, it cannot be extended once again to its original length; so normally, a given holder 18 cannot be used interchangeably with differently sized flower pots, although a plurality of such holders 18 would be adaptable to a corresponding number of flower pots of different sizes, shapes and plant foliage configurations.

As illustrated in FIG. 5, each finger 30 is cross-sectionally V-shape, with the apex 32 being downwardly directed. The apices 32 of the various fingers 30 form a common plane with a downward boss 31 of plate 22. This common plane is slightly downwardly offset relative to the bottom face 22a of discoid plate 22, so that bottom face 22a remain slightly spaced upwardly from the flooring 12 of the flower pot 10. The opposite top edges 34a, 34b, of the V-shape fingers 30 may be coplanar with the top face 22b of discoid plate 22, as illustrated in FIG. 4, although this is a secondary feature.

FIG. 5 shows that V-shaped fingers 30 have an end wall 35 which provides structural integrity to each finger 30 by linking its two side walls at their outer free end. This will increase the stiffness of finger 30 and help prevent its widening and flattening. Of course, if fingers 30 are at least partially cut, their outer free end will not have any end wall 35. However, it is less important to have such a wall 35 as the length of a finger 30 diminishes, for it will have less a tendency to flatten out as it gets shorter because it is still closed at its extremity where it merges with base plate 22.

The fact that fingers 30 are V-shaped and closed at both their extremities will increase considerably the stiffness of fingers 30, and thus will allow them to have a much thinner cross-section. This will facilitate enormously the cutting away of part or all of fingers 30, a pair of conventional scissors being highly sufficient to cut away a finger 30, even if the length chosen does not coincide with a weak line.

The fact that plate 22 has a boss 31, that fingers 30 are V-shaped and that their apices 32 protrude downwardly from the bottom face 22a of plate 22 will result in minimal contact between elongated fingers 30 and bottom wall 12 of plant pot 10 and in no contact of plate 22 with bottom wall 12. Indeed, only the apices of fingers 30 and boss 31 will be in contact with bottom wall 12, which is especially advantageous if there are a plurality of studs scattered on the surface of bottom wall 12. Since base plate 22 is kept horizontal so that rod 20 may be vertical, fingers 30 must not rest on any such studs. By resting on the bottom wall 12 with only boss 31 and the apices 32 of fingers 30, holder 18 reduces its contact surface with bottom wall 12, and thus the range of its possible different positions within the pot is greatly increased. The etude may well be positioned under plate 20 or partly under one side wall of a finger 30 without the latter abutting on it.

FIGS. 3 and 4 show that fingers 30 radially extend inwardly relative to the outer periphery of base plate 22. This is very important, for if fingers 30 are cut off at their minimal length, i.e. along the periphery of base plate 22, there is still a small part of fingers 30 left under base plate 22, to space the latter from bottom wall 12 of plant pot 10, for the above-mentioned reasons.

Five fingers 30 are shown in the drawings. Other numbers of fingers 30, e.g. three, four, six, or more, would not be excluded from the scope of the invention, provided the number of fingers would be sufficient to positively prevent of the holder 18 inside the flower pot tilting under the force exerted by the plant on rod 20.

It is important to note that plant holder 18 (18') of the invention must rest directly on the bottom wall 12 of plant pot 10 (10'), without any soil between them. Indeed, when the soil is watered and becomes more fluid, the holder, under the pull exerted by the plant may tilt significantly, relative to the pot. This of course is highly undesirable, since it goes against the purpose of the plant holder, which is to hold the plant in the position determined by the initial position of the plant holder and support rod, the rod being vertical.

The material constituting the holder should be rigid, sturdier at the socket parts 26 and 28, and thinner and frangible at the finger parts 30. To keep manufacturing costs down, all the constituting integral elements 22, 26, 28, 30, of holder 18 should be made from the same material, preferably a plastic material under injection molding such as PolyVinyl Chloride, polystyrene, polystyrene ABS, and the like.

It is understood that with the present plant holder, the exact location of the plant support may be adjusted relative to the side wall 14 (14') of the plant pot and, therefore, should not be an obstruction to the planting, upkeeping, or to progressive growth of a plant within the pot.

I claim:

1. A self-positioning device for supporting in upstanding fashion inside a flower pot an elongated plant holder defining a lower end portion, said flower pot having a base wall, a side wall and a top mouth, said self-positioning device comprising:

(a) a generally flat base plate member defining a top face, adapted for spacedly laying next to said base wall of said flower pot, said base plate member being adapted to be embedded into a layer of earth;

(b) a first socket member integral with said base plate member, upwardly protruding from said top face and defining an open outer top free end, said first socket member adapted to receive said lower end portion of said elongated plant holder in said open outer top free end and to support said plant holder in upright position;

(c) a number of radial finger members, extending radially outwardly from said base plate member integrally thereof and substantially within the plane thereof, said finger members being cross-sectionally V-shaped, with the apices thereof being downwardly directed, for direct engagement against said flower pot base wall; and (d) means for adjusting the length of each said finger member;

wherein said self-positioning device is adaptable to any one of flower pots of different sizes and shapes and wherein said self-positioning device enables selective positioning of said first socket member within said flower pot to accommodate any one of a variety of plant foliage configurations.

2. A self-positioning device as defined in claim 1, wherein said length-adjusting means includes a number of lengthwisely spaced transverse grooves made in said finger members to facilitate the cutting of said finger members.

3. A self-positioning device as defined in claim 2, wherein said base plate member further defines a bottom face and wherein said apices of said V-shaped finger members define a common plane which is downwardly offset relative to said base plate member bottom face, whereby said base plate member overhangs spacedly over said flower pot base wall.

4. A self-positioning device as defined in claim 3, wherein said finger members radially extend inwardly relative to the outer periphery of said base plate member.

5. A self-positioning device as defined in claim 2, further comprising a second socket member upwardly projecting from said base plate member, said first and said second socket members being tangentially adjacent and integrally linked to one another at their respective outer periphery, whereby said first and said second socket members gain structural stiffness due to the greater total cross-section thereof, relative to said first socket member alone and wherein said second socket member defines an open outer top free end, said first and said second socket member open outer top free ends being of different sizes to be engaged by and accommodate plant holders of different sizes.

6. A self-positioning device as defined in claim 5, further comprising a stay plate member edgewisely anchored on said base plate member and integrally attached to said second socket member.

7. A self-positioning device as defined in claim 6, wherein said first and second socket members and said stay plate member are aligned.

8. A self-positioning device as defined in claim 2, wherein each of said V-shaped finger members defines two upwardly-extending sides and wherein each said finger member comprises an end wall which provides structural integrity to each said finger member by linking said two upwardly extending sides to one another.

9. A self-positioning device as defined in claim 2, wherein there are at least three said finger members, of which at least two finger members are directed in generally opposite directions.

10. A self-positioning device as defined in claim 2, wherein there are five said finger members, said finger members being circumferentially equidistant.

* * * * *

UNITED STATES PATENT AND TRADEMARK OFFICE
CERTIFICATE OF CORRECTION

PATENT NO. : 5,501,038
DATED : March 26, 1996
INVENTOR(S) : Antoine Gregorato

It is certified that error appears in the above-identified patent and that said Letters Patent is hereby corrected as shown below:

Title page, item [76] inventor: should read -- Gregorato  and
    item [19]

Signed and Sealed this

Twenty-third Day of July, 1996

Attest:

BRUCE LEHMAN

*Attesting Officer*    *Commissioner of Patents and Trademarks*